(12) United States Patent
Rotheisler

(10) Patent No.: US 8,006,850 B2
(45) Date of Patent: Aug. 30, 2011

(54) ARTICULATED JIB

(76) Inventor: Randy Rotheisler, Vancouver (CA)

( * ) Notice: Subject to any disclaimer, the term of this patent is extended or adjusted under 35 U.S.C. 154(b) by 0 days.

(21) Appl. No.: 12/363,633

(22) Filed: Jan. 30, 2009

(65) Prior Publication Data
US 2010/0193457 A1 Aug. 5, 2010

(51) Int. Cl.
B66C 23/76 (2006.01)
(52) U.S. Cl. .......................... 212/196; 212/300; 352/243
(58) Field of Classification Search .................. 212/196, 212/300; 352/243
See application file for complete search history.

(56) References Cited

U.S. PATENT DOCUMENTS

| | | | |
|---|---|---|---|
| 3,434,491 A * | 3/1969 | Bily ............................. | 137/15.09 |
| 3,581,769 A * | 6/1971 | Haley et al. .................... | 137/615 |
| 3,790,773 A | 2/1974 | Sapper | |
| 3,805,834 A * | 4/1974 | Bily ............................. | 137/615 |
| 3,850,307 A * | 11/1974 | Motoda ......................... | 212/237 |
| 4,109,688 A * | 8/1978 | Jameson ....................... | 141/387 |
| 4,142,551 A * | 3/1979 | Wilms .......................... | 137/615 |
| 4,215,972 A * | 8/1980 | Yamasaki et al. ............. | 414/742 |
| 4,339,100 A | 7/1982 | Heller et al. | |
| 4,341,242 A * | 7/1982 | Hermanson ................... | 137/615 |
| 4,418,718 A * | 12/1983 | Fusy ............................. | 137/615 |
| 4,666,364 A * | 5/1987 | Doege et al. .................. | 414/742 |
| 5,033,705 A | 7/1991 | Reagan | |
| 5,192,963 A | 3/1993 | Hill | |
| 5,454,042 A | 9/1995 | Drever | |
| 5,531,412 A | 7/1996 | Ho | |
| 5,713,545 A | 2/1998 | Nakamura | |
| 5,825,536 A * | 10/1998 | Yasunaga et al. ............. | 359/384 |
| 6,045,104 A | 4/2000 | Nakamura et al. | |
| 6,105,909 A * | 8/2000 | Wirth et al. .................. | 248/123.2 |
| 6,646,798 B2 * | 11/2003 | Schmidt et al. ............... | 359/382 |
| 6,705,773 B2 | 3/2004 | Fix | |
| 6,752,541 B1 * | 6/2004 | Dykyj ........................... | 396/428 |
| 6,776,488 B2 | 8/2004 | Burbulla | |
| 7,189,246 B2 | 3/2007 | Otsuka et al. | |

FOREIGN PATENT DOCUMENTS

| | | | |
|---|---|---|---|
| EP | 0131664 | | 1/1985 |
| FR | 2 626 957 A | * | 8/1989 |
| RU | 655639 | | 4/1979 |

OTHER PUBLICATIONS

Email from Ray Tostado to Randy Rotheisler dated Jan. 17, 2011.
Image attached to email Ray Tostado to Randy Rotheisler dated Jan. 17, 2011.
English Translation of SU655639.

* cited by examiner

Primary Examiner — Thomas J. Brahan
(74) Attorney, Agent, or Firm — Cameron IP

(57) ABSTRACT

An articulated jib for moving a load is supported on a base and comprises a first jib arm pivotably connected to a base. The first jib arm functions as a bascule and is pivotable about a first axis. There is a first counterweight disposed on the first jib arm. A second jib arm is pivotably connected to the first jib arm and is pivotable about a second axis. A linking rod connects the second jib arm to a lever arm which is also pivotably connected to the base. There is a second counterweight disposed on the lever arm.

10 Claims, 7 Drawing Sheets

US 8,006,850 B2

ARTICULATED JIB

BACKGROUND OF THE INVENTION

1. Field of the Invention

The present invention relates to jibs and, in particular, to a simplified, articulated camera jib with improved balance and stability.

2. Description of the Related Art

It is known to provide articulated camera jibs that allow movement about three distinct horizontal axes. Examples are disclosed in U.S. Pat. No. 5,033,705 issued on Jul. 23, 1991 to Reagan and U.S. Pat. No. 5,192,963 issued on Mar. 9, 1993 to Hill. These jibs allow a camera to be moved without requiring movement of a base which supports the jib. However, these jibs typically use timing belts or chain drives to ensure synchronization of all the various elements in order to provide balance and stability. The timing belts or chain drives add undesired structure and weight to the jib.

To overcome the above-mentioned shortcomings of timing belts and chain drives, some articulated camera jibs use linking rods to ensure synchronization of all the various elements. An example of such a jib is disclosed in U.S. Pat. No. 5,531,412 issued on Jul. 2, 1996 to Ho. However, the jib disclosed by Ho has a complex structure including four interdependent "four-linking mechanisms". Each of the "four-linking mechanisms" comprises two pairs of parallel linking bars. There is accordingly a need for a simplified, articulate jib with improved balance and stability.

SUMMARY OF THE INVENTION

It is an object of the present invention to provide a simplified, articulated jib with improved balance and stability. In particular, it is an object of the present invention to provide an improved articulated jib in which each jib arm is independently counterbalanced.

Accordingly, there is provided an articulated jib for moving a load. The jib is supported on a base and comprises a first jib arm pivotably connected to the base. The first jib arm functions as a bascule and is pivotable about a first axis. There is a first counterweight disposed on the first jib arm. A second jib arm is pivotably connected to the first jib arm and is pivotable about a second axis. A linking rod connects the second jib arm to a lever arm which is also pivotably connected to the base. There is a second counterweight disposed on the lever arm.

In one embodiment the first jib arm includes two parallel frame bars. Each of the frame bars is pivotably connected to the base and to the second jib arm, to form a parallel link mechanism. The linking rod is an adjustable length linking rod which includes two threadedly connected portions. The length of the linking rod may be adjusted by changing the degree to which a first said portion of the linking rod is threadedly received by a second said portion of the linking rod. A length of the linking rod between points of connection with the second jib arm and the lever arm is equal to or less than a length of the frame bars, of the first jib arm, between respective points of connection with second jib arm and the base. The base is rotatably mounted on a tripod or other suitable mount. The load is preferably equipment used in the film industry such as a camera. However, the jib may also be used to move other types of loads such as magnifying lenses or medical equipment such as operating microscopes.

The jib provides a wide range of movement allowing the load to be moved horizontally, vertical, in a circle or any combination thereof.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
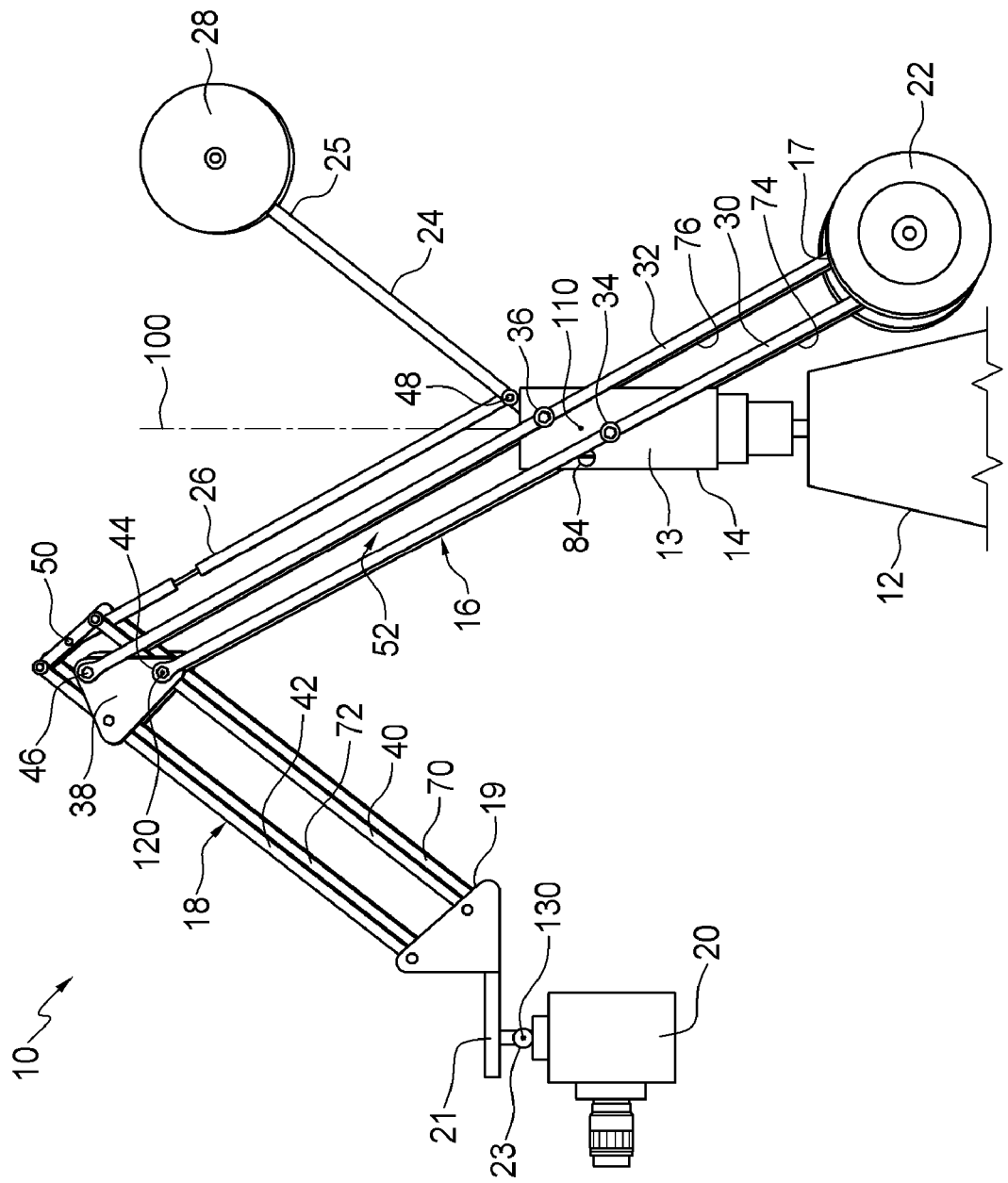
FIG. 1 is an elevation side view of an articulated jib in a first position.
Figure 4:
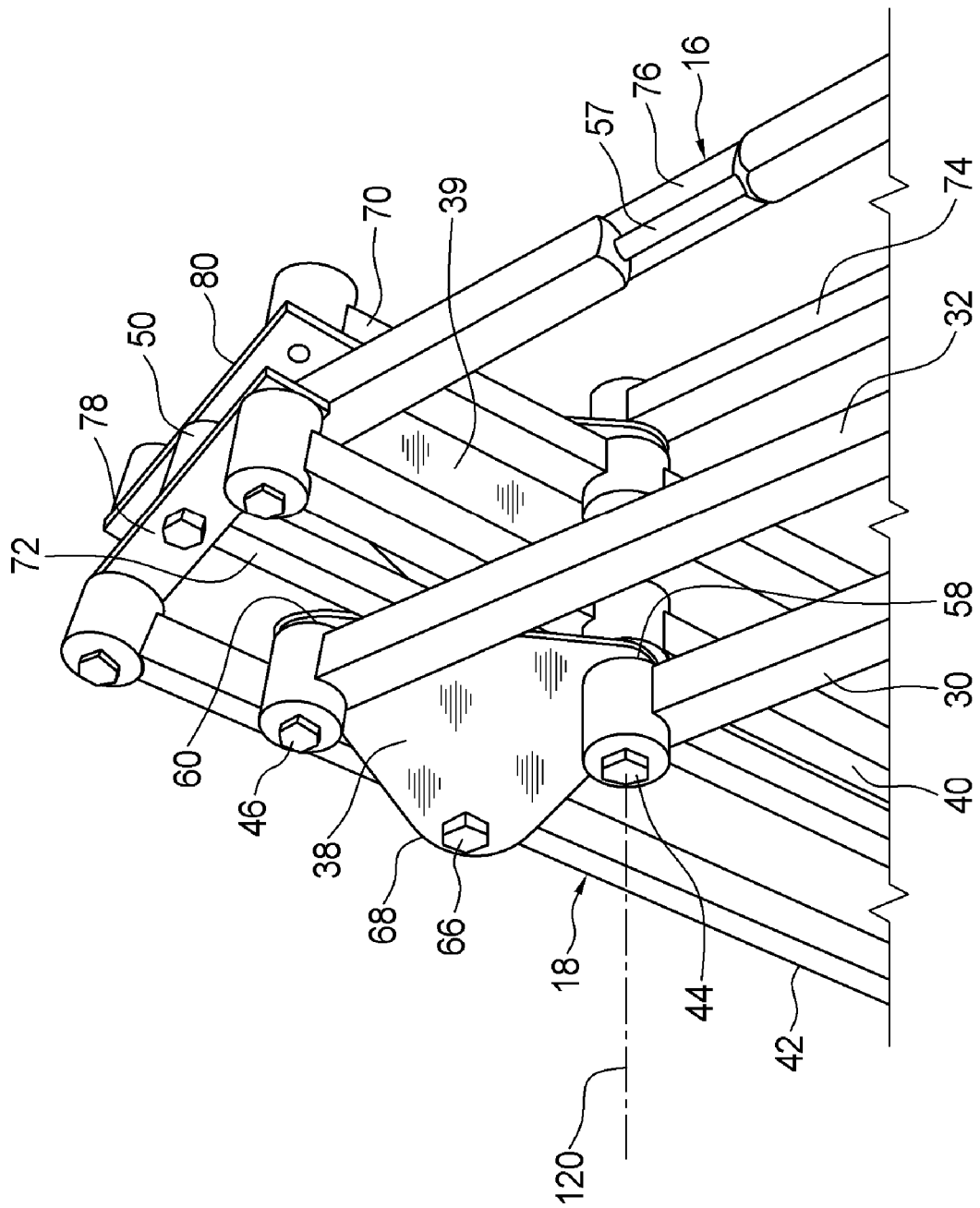
FIG. 4 is an enlarged, fragmentary perspective view of the connection between the first jib arm and the second jib arm if the articulated jib of FIG. 1.

Referring to the drawings and first to FIG. 1 this shows an articulated jib 10 rotatably mounted on a tripod 12, which is shown in fragment. The jib 10 is rotatable on the tripod 12 about a vertical axis 100. In this example, a base 14 supports the jib 10 and functions as a fulcrum. A first jib arm 16 is defined by four longitudinal frame bars 30, 32, 74, and 76 which are aligned in parallel, in a generally quadrate formation (as best shown in FIG. 4). The first jib arm 16 is pivotably connected to the base 14 by pivot pins 34 and 36, and functions as a bascule to allow movement about a first generally horizontal pivot axis 110. A second jib arm 18 is also defined by four longitudinal frame bars 40, 42, 70, 72 which are aligned in parallel, in a generally quadrate formation (as best shown in FIG. 4). The second jib arm 18 is pivotably connected to the first jib arm 16 at bolt 44 to allow movement about a second generally horizontal pivot axis 120. A camera 20 is mounted on a platform 21 at a distal end 19 of the second jib arm 18. The camera 20 is pivotable about a support 23 to allow movement about a third horizontal pivot axis 130.

A first counterweight 22 is disposed at an end 17 of the first jib arm 16 opposite the second jib arm 18 and camera 20. The first counterweight 22 counterbalances the second jib arm 18 and the camera 20 as the first jib arm 16 pivots about the first horizontal pivot axis 110. A second counterweight 28 is disposed at a distal end 25 of a lever arm 24. The lever arm 24 is pivotably connected to the base 14 by a pivot pin 84. A linking rod 26 connects the lever arm 24 to the second jib arm 18. The second counterweight 28 counterbalances the camera 20 as the second jib arm 18 pivots about the second horizontal pivot axis 120.

In FIG. 1 only a first side of the jib 10 is shown in detail. A second side of the jib 10 is a mirror image of the first side of the jib 10. For example, frame bars 30 and 32 of the first jib arm 16 are on the first side of the jib 10 while frame bars 74 and 76 are on the second side of the jib 10. Likewise, frame bars 40 and 42 of the second jib arm 18 are on the first side of the jib 10 while frame bars 70 and 72 are on the second side of the jib 10. Therefore, only the first side of the jib 10 will be described in detail herein. It will be understood that the second side of the jib 10 has a substantially similar structure and functions in a substantially similar manner. Two of the longitudinal frame bars 30 and 32 of the first jib arm 16 are each pivotably connected to a lateral side 13 of the base 14 by pivot pins 34 and 36, respectively. The pivot pins are 34 and 36 are not vertically aligned with one another having regard to the vertical axis 100 about which the jib 10 rotates. A triangular plate 38 is mounted on the second jib arm 18 and extends between two of the longitudinal frame bars 40 and 42 of the second jib arm 18. The longitudinal frame bars 30 and 32 of the first jib arm 16 are connected to the triangular plate 38 by bolts 44 and 46, respectively. The other two longitudinal frame bars 74 and 76 of the first jib arm 16 are coupled to the second side of the jib 10 in a similar manner. The linking rod 26 is connected the lever arm 24 by a bolt 48. The linking rod 26 is also connected to the second jib arm 18 at a pivot shaft 50.

Figure 2:
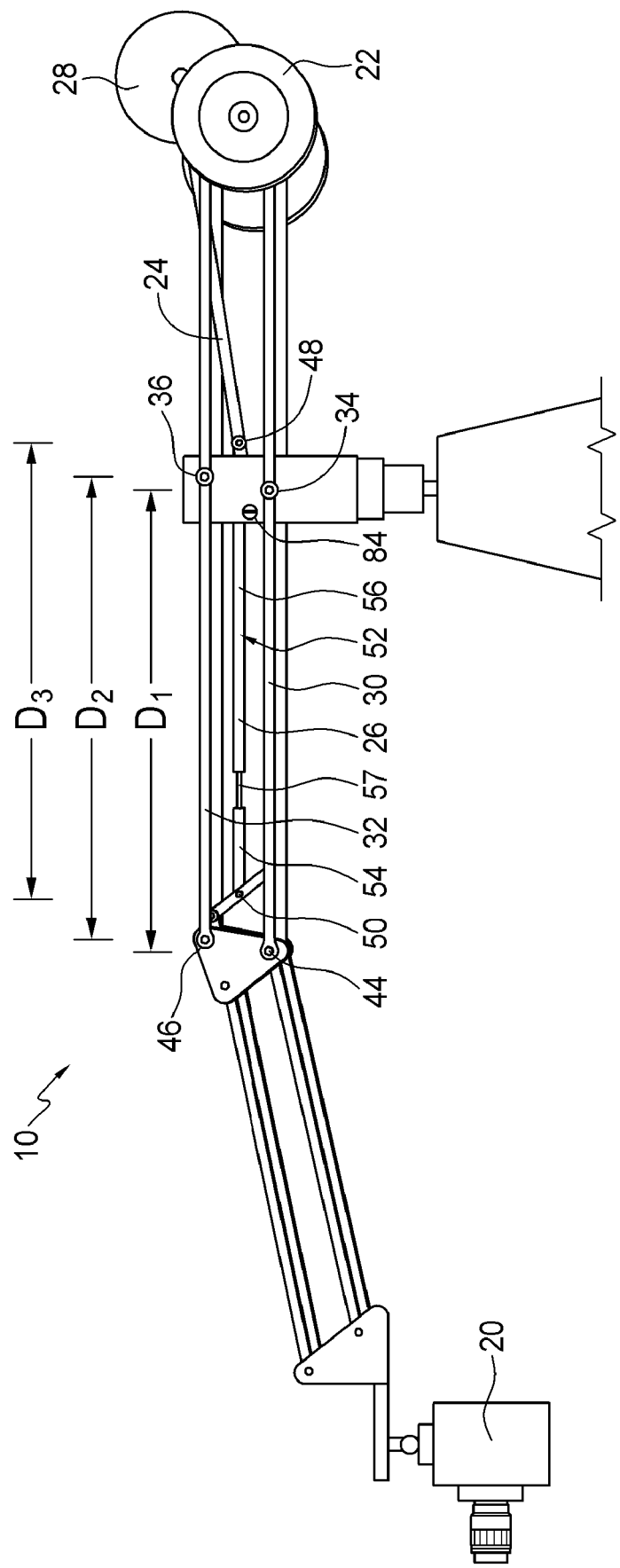
FIG. 2 is another elevation side view of the articulated jib of FIG. 1 in a second position.
Figure 6:
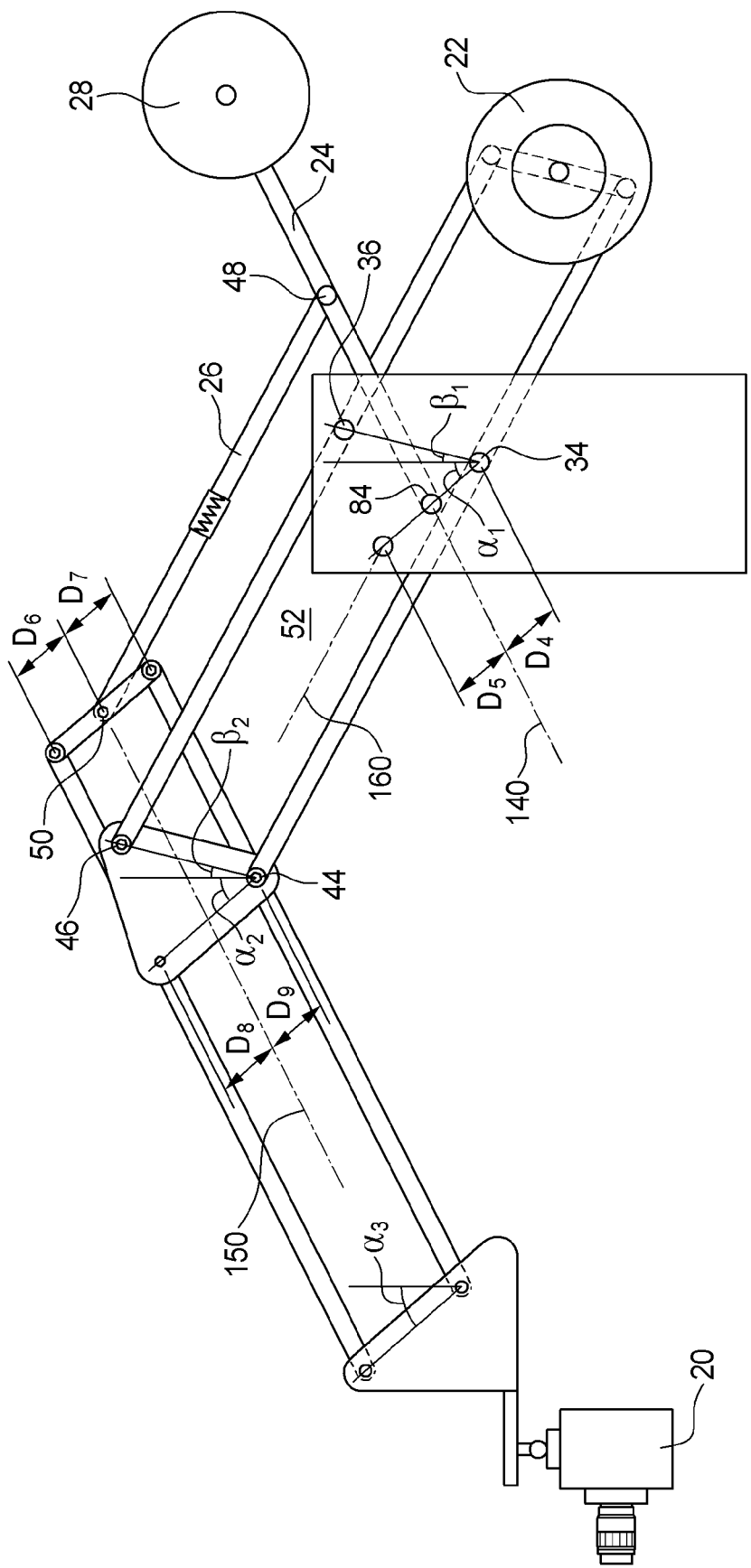
FIG. 6 is a partly schematic, side elevation view of the articulated jib of FIG. 1.

As best shown in FIG. 2, the distance $D_1$ between the pivot pin 34 and bolt 44, which are coupled to a longitudinal frame bar 30 of the first jib arm 16, is substantially equal to the distance $D_2$ between the pivot pin 36 and bolt 46, which are coupled to longitudinal frame bars 32 of the first jib arm 16. The pivot pins 34, 36 and bolts 44, 46 define the corners of a first parallelogram link mechanism 52 which is best shown in FIG. 6. As seen by comparing FIGS. 1 and 2, the first parallelogram link mechanism 52 changes shape as the first jib arm 16 pivots about the base 14. This ensures that the first counterweight 22 moves appropriately in the horizontal and vertical directions to counterbalance the second jib arm 18 and the camera 20 through a range of motion.

In FIG. 6 angles $\alpha_1$ and $\alpha_2$ are substantially equal, and angles $\beta_1$ and $\beta_2$ are substantially equal. Angle $\alpha_3$ is also substantially equal to angles $\alpha_1$ and $\alpha_2$. The jib 10 is designed to maintain angles $\alpha_1$, $\alpha_2$, and $\alpha_3$ equal in response to pivoting by either the first jib 16 or second arm 18. As a result, a longitudinal axis 140 of the lever arm 24 is maintained substantially parallel to a longitudinal axis 150 of the second jib arm 18. This ensures that the second counterweight 28 moves appropriately in the horizontal and vertical directions to counterbalance the camera 20 through the range of motion. Distances $D_4$ to $D_9$ are all substantially equal to each other. Since operation of a parallelogram link mechanism, or parallel link, is well known in the art and is discussed in U.S. Pat. No. 5,713,545 issued to Nakamura on Feb. 3, 1998, the full disclosure of which is incorporated herein by reference, operation of the parallelogram link mechanism 52 is not discussed in further detail herein.

Referring back to FIG. 2, the distance $D_3$ between the bolt 48, which connects the linking rod to the lever arm 24, and the pivot shaft 50, which connects the linking rod 26 to the second jib arm 18, is equal to or less than both distances $D_1$ and $D_2$. In this example, the linking rod 26 is an adjustable length linking rod which comprises two potions 54 and 56 which are threadedly connected by a threaded member 57 disposed on an end of a first one of the portions 54 of the linking rod 26. Changing the amount to which the threaded member 57 is threadedly received by a second one of the portions 56 of the linking rod 26 enables distance $D_3$ to be changed to account for variances in camera weights. In other embodiments, telescoping portions or another means may be used to change the distance $D_3$. The underlying principle being that a length of the linking rod 26 between its points of connection with the second jib arm 18 and the lever arm 24 ($D_3$) is equal to or less than a length of the frame bars 30, 32, 74, and 76 of the first jib arm 16 between their respective points of connection with second jib arm 18 and the lever arm 24 ($D_1$ and $D_2$).

Figure 3:
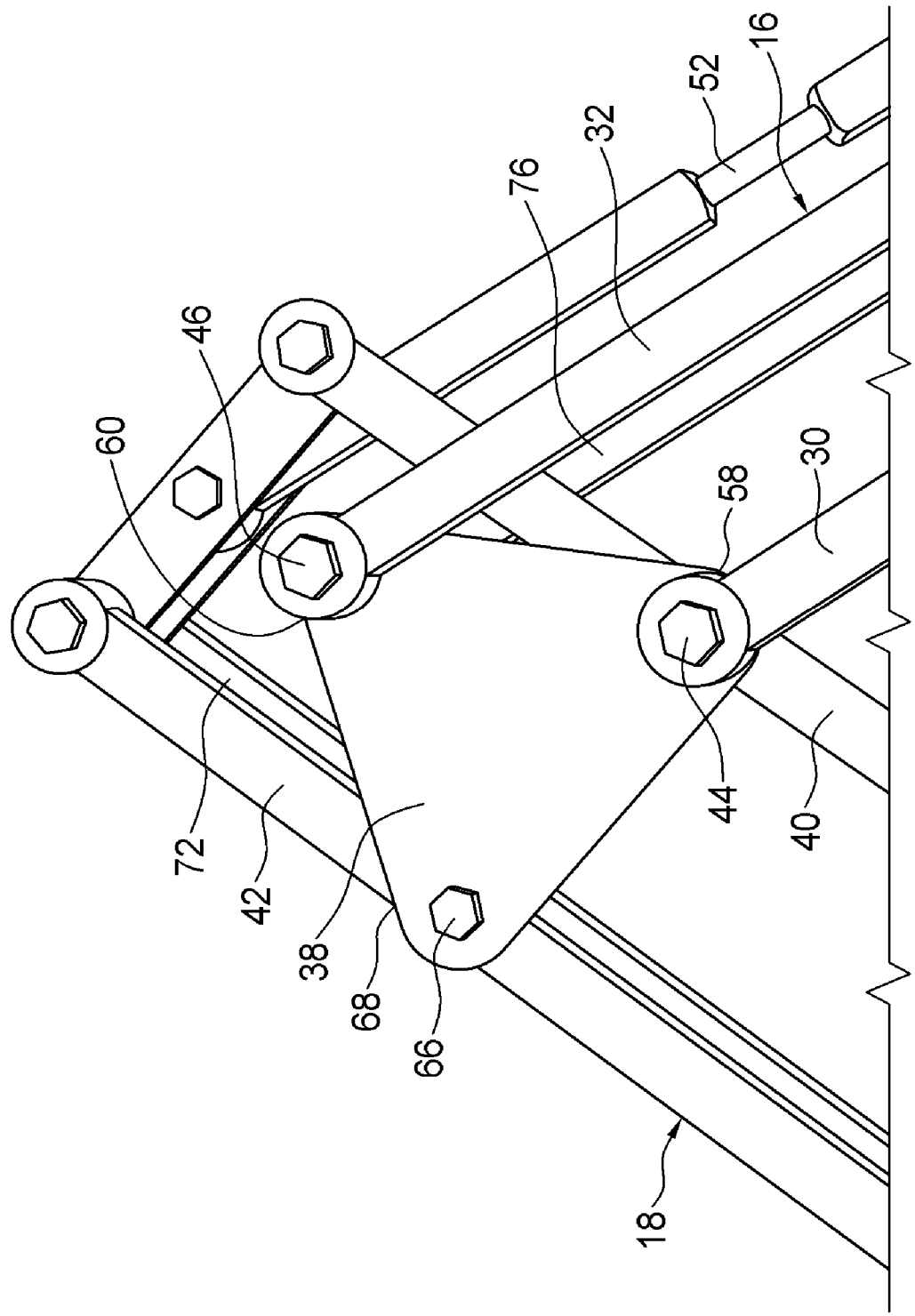
FIG. 3 is an enlarged, fragmentary elevation view of a connection between a first jib arm and a second jib arm of the articulated jib of FIG. 1.

Referring now to FIGS. 3 and 4 the pivotable connection between the first jib arm 16 and the second jib arm 18 is shown in greater detail. Longitudinal frame bars 30 and 32 of the first jib arm 16 are connected to the triangular plate 38 by corresponding bolts 44 and 46 adjacent respective vertices 58 and 60 of the triangular plate. As best shown in FIG. 4, longitudinal frame bars 40 and 42 of the second jib arm 18 are also connected to the triangular plate 38. A first one of the longitudinal bars 40 of the second jib arm 18 is pivotably mounted on the bolt 44 which also connects the first one of the longitudinal frame bars 30 of the first jib arm 16 to the triangular plate 38. This connection allows the second jib arm 18 to pivot about the second axis 120. The triangular plate 38 is also pivotable mounted on the bolt 44 between the first and second jib arms 16 and 18. The second jib arm 18 and the triangular plate 38 are independently pivotable. A bolt 66 connects a third vertex 68 of the triangular plate 38 to a second one of the longitudinal frame bars 42 of the second jib arm 18. The second jib arm 18 also has a pair of end links 78 and 80, each of which links a respective corresponding two of the longitudinal frame bars 40, 42 and 70, 72 of the second jib arm 18. The pivot shaft 50 which connects the linking bar to the second jib arm 18 extends between the end links 78 and 80.

The other two longitudinal frame bars 70 and 72 of the second jib arm 18 are coupled to a corresponding triangular plate 39 on the second side of the jib 10 in a similar manner, as are the other two longitudinal frame bars 74 and 76 of the first jib arm 16.

Figure 5:
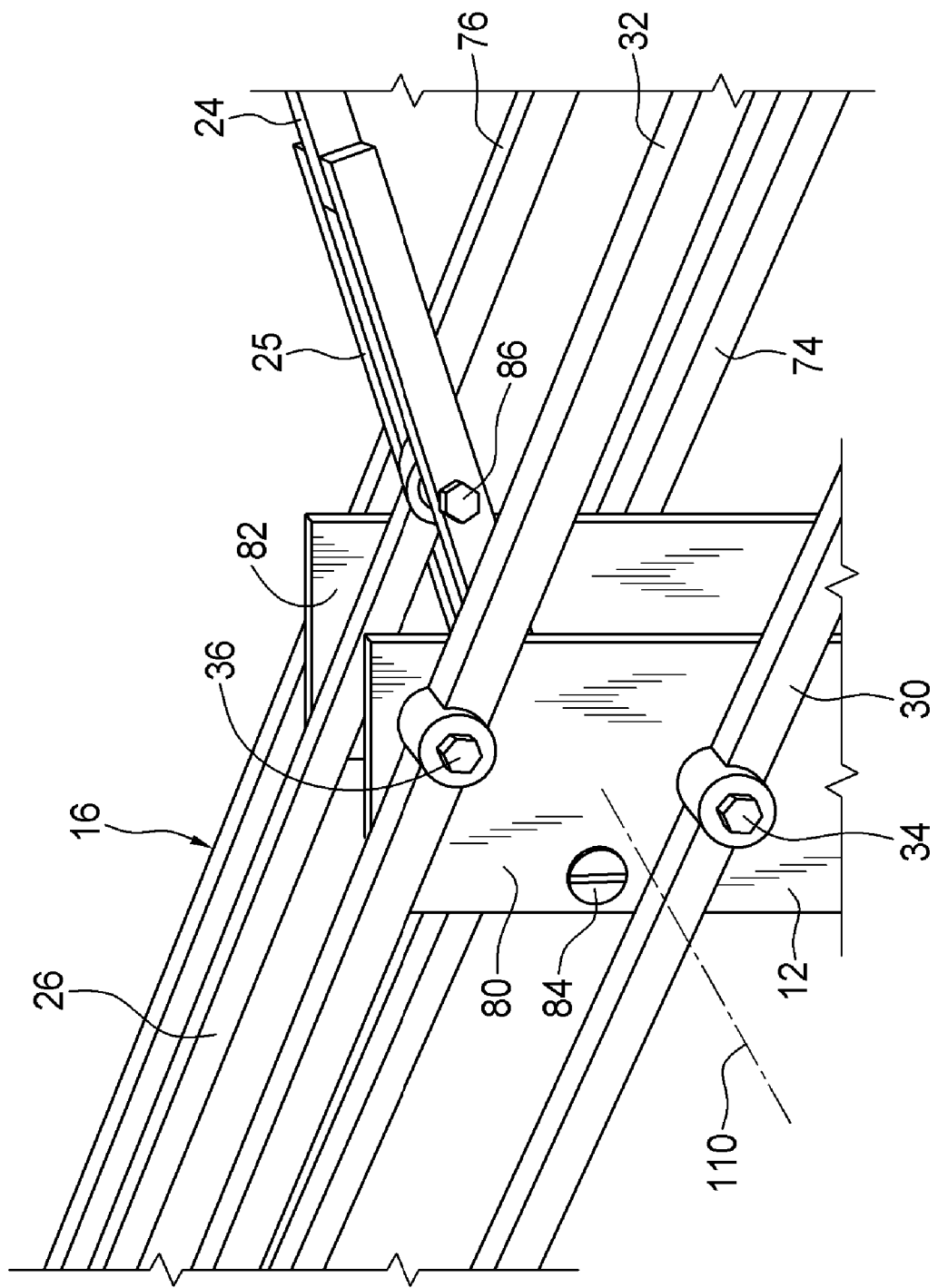
FIG. 5 is an enlarged, fragmentary perspective view of a fulcrum of the articulated jib of FIG. 1.

Referring now to FIG. 5, the pivotable connection between the first jib arm 16 and the base 14 is shown in greater detail. The base 14 has a U-shape with spaced-apart lateral side walls 80 and 82. Two of the longitudinal frame bars 30 and 32 of are pivotably connected to an outer side of a first one of the lateral side walls 80 by corresponding pivot pins 34 and 36. The other two of the longitudinal frame bars 74 and 76 are pivotably connected to an outer side of a second of the lateral side walls 82 by corresponding pivot pins (not shown). FIG. 5 also shows the pivotable connection between the base 14 and the lever arm 24. The lever arm 24 has a bifurcated end portion 25 which is pivotably mounted on a pivot shaft 84 that extends between the lateral side walls 80 and 82 of the U-shaped base 14. The linking bar 26 is pivotably connected to the bifurcated end portion 25 of the lever arm 26 by a bolt 86.

In operation, a cameraman (not shown) may move the camera 20 to a desired position. The parallelogram link mechanism 52 and first counterweight 22 balance the first jib arm 16 as it is pivoted about the first horizontal pivot axis 110. The second counterweight 28 balances the second jib arm 18 as it is pivoted about the second horizontal axis 120. The camera 20 may thereby be moved, in a balanced manner, toward or away from a stationary object being filmed without requiring movement of the tripod 12. Alternatively, the camera 20 may be moved, in a balanced manner, to follow a moving object being filmed without requiring movement of the tripod 12.

Since the first and second jib arms 16 and 18 are independently counterbalanced, the counterweights 22 and 28 are only a minimal distance from the first and second pivot axes 110 and 120. This allows the jib 10 to be used in restricted spaces commonly found on location in the film industry. The compact design of the jib 10 also allows it to be folded and easily transported between locations. The jib 10 is easily scalable and can therefore be custom manufactured for use with a wide range of cameras including small, lightweight, personal video cameras and large, heavy, motion picture cameras. The simplified structure allows for low cost construction.

Although in this example the jib 10 is used to move the camera 20, the jib 10 may be used to move any type of load. For example, the jib 10 may be used to move other equipment used in the film and video industry such as cameras. The jib 10 may also be used to move other types of loads such as magnifying lenses or medical equipment such as operating microscopes. In another embodiment, the jib may be motorized and computer controlled with step motors.

Figure 7:
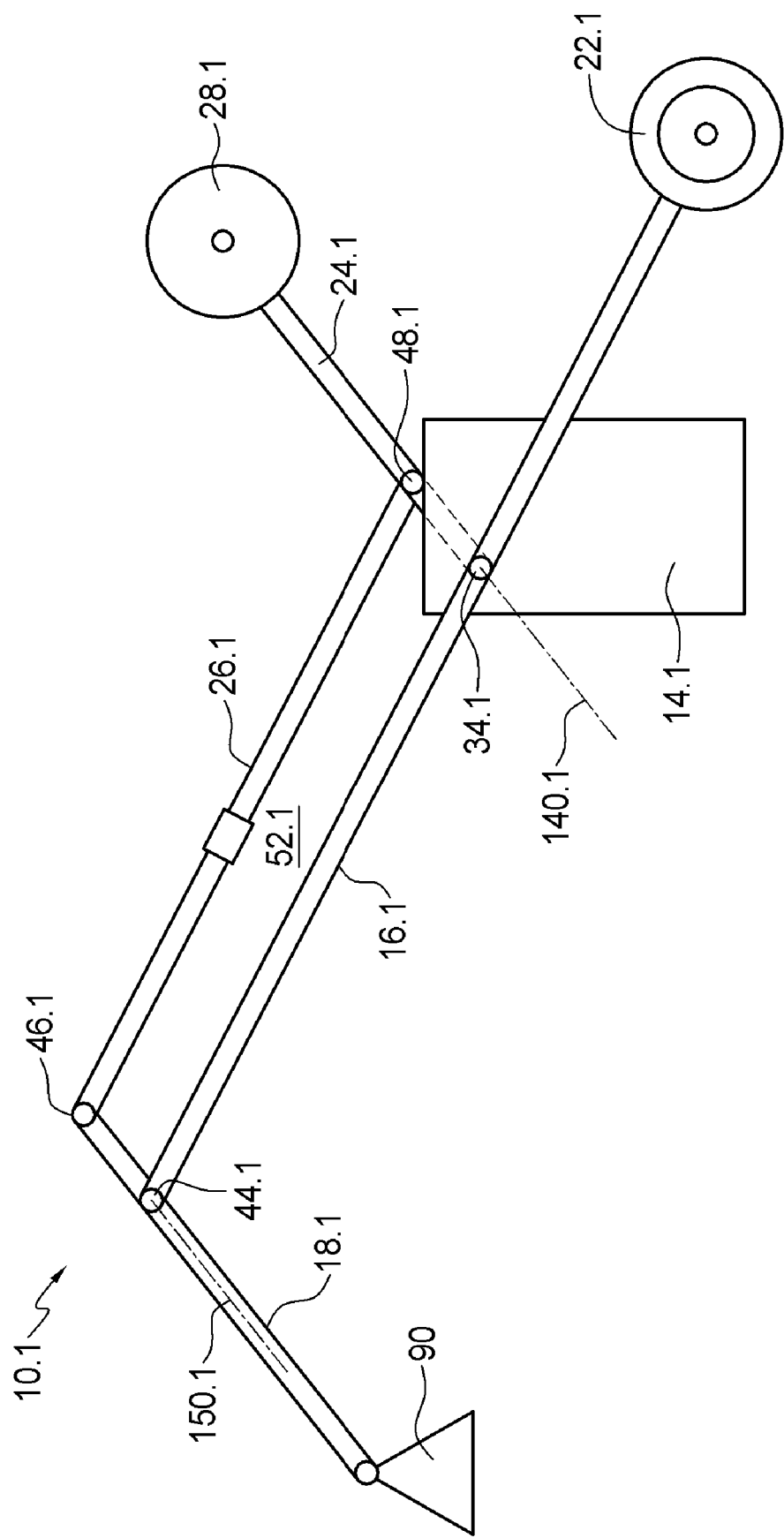
FIG. 7 is partly schematic, side elevation view of a simplified articulated jib.

FIG. 7 shows a jib 10.1 accordingly a simplified embodiment of the invention. In FIG. 7 like parts have been given like reference numerals as in FIGS. 1 to 6 with the additional numerical designation "0.1". In the embodiment shown in FIG. 7, corners of a first parallelogram link mechanism 52.1 is defined by pivot pin 34.1 and bolts 44.1, 46.1, 48.1. A longitudinal axis 140.1 of the lever arm 24.1 is maintained parallel to a longitudinal axis 150.1 of the second jib arm 18.1. This ensures that the first and second counterweights 22.1 and 28.1 moves appropriately in the horizontal and vertical directions to counterbalance a load 90 through the range of motion. The underlying principle is that lever arm 24.1 pivots together with second jib arm 18.1.

It will be understood by a person skilled in the art that the terms "vertical" and "horizontal" as used herein are used in relation to the orientations described in FIGS. 1 and 2, and are not intended to limit the scope of the invention.

It will be understood by a person skilled in the art that many of the details provided above are by way of example only and are not intended to limit the scope of the invention which is to be determined with reference to following claims.

What is claimed is:

1. An articulated jib for moving a camera, the jib being supported on a base and the jib comprising:
    a first jib arm pivotably connected to the base, the first jib arm functioning as a bascule and being pivotable about a first axis;
    a first counterweight disposed on the first jib arm;
    a second jib arm pivotably connected to the first jib arm, the second jib arm being pivotable about a second axis and the camera being disposed at a distal end of the second jib arm;
    a lever arm pivotably connected to the base and a linking rod connecting the lever arm to the second jib arm, the lever arm extending away from the linking rod towards a distal end of the lever arm, and the linking rod being pivotably connected to the second jib arm;
    a second counterweight disposed at the distal end of the lever arm; and
    wherein the first jib arm includes two parallel frame bars, each of the frame bars being pivotably connected to the base and connected to the second jib arm to form a parallelogram link mechanism, and wherein a length of the linking rod extending between its points of connection with the second jib arm and the lever arm is less than lengths of the frame bars of the first jib arm between their respective points of connection with second jib arm and the base.

2. The jib as claimed in claim 1 wherein the linking rod is an adjustable length linking rod.

3. The jib as claimed in claim 2 wherein the linking rod includes two threadedly connected portions wherein the length of the linking rod may be adjusted by changing an amount of a first said portion of the linking rod which is threadedly received by a second said portion of the linking rod.

4. The jib as claimed in claim 1 wherein the base is rotatably mounted on a tripod.

5. An articulated jib for moving a camera, the jib being supported on a base which is rotatable about an axis and the jib comprising:
    a first jib arm including two parallel frame bars, each of the frame bars being pivotably connected to the base by corresponding pivot pins which are offset to one another having regard to the axis about which the base is rotatable, and the first jib arm functioning as a bascule and being pivotable about a first pivot axis;
    a first counterweight disposed on the first jib arm;
    a second jib arm pivotably connected to the first jib arm, the second jib arm being pivotable about a second pivot axis and the camera being disposed at a distal end of the second jib arm;
    a lever arm pivotably connected to the base and a linking rod connecting the lever arm to the second jib arm, the lever arm extending away from the linking rod towards a distal end of the lever arm, and the linking rod being pivotably connected to the second jib arm;
    a second counterweight disposed at the distal end of the lever arm; and
    wherein each of the frame bars of the first jib arm is also pivotably connected to the second jib arm by a corresponding pivot pin so as to form a parallelogram link mechanism and wherein a length of the linking rod between points of connection with the second jib arm and the lever arm is less than lengths of the frame bars of the first jib arm between their respective points of connection with second jib arm and the base.

6. The jib as claimed in claim 5 wherein the linking rod is an adjustable length linking rod.

7. The jib as claimed in claim 6 wherein the linking rod includes two threadedly connected portions wherein the length of the linking rod may be adjusted by changing an amount of a first said portion of the linking rod which is threadedly received by a second said portion of the linking rod.

8. A manually operable articulated jib for moving a camera, the jib being supported on a base and the jib comprising:
    a first jib arm pivotably connected to the base, the first jib arm functioning as a bascule and being pivotable about a first axis;
    a first counterweight disposed on the first jib arm;
    a second jib arm pivotably connected to the first jib arm, the second jib arm being pivotable about a second pivot axis and the camera being disposed at a distal end of the second jib arm;
    a lever arm pivotably connected to the base and a linking rod connecting the lever arm to the second jib arm, the lever arm extending away from the linking rod towards a distal end of the linking rod, the linking rod being pivotably connected to the second jib arm, and a length of the linking rod extending between its points of connection with the second jib arm and the lever arm being less than lengths of the frame bars of the first jib arm between their respective points of connection with second jib arm and the base;
    a second counterweight disposed at the distal end of the lever arm; and
    wherein the first jib arm includes two parallel frame bars, each of the frame bars being pivotably connected to the base and connected to the second jib arm to form a parallelogram link mechanism.

9. The jib as claimed in claim 8 wherein the linking rod is an adjustable length linking rod.

10. The jib as claimed in claim 8 wherein the linking rod includes two threadedly connected portions wherein the length of the linking rod may be adjusted by changing an amount to which a first said portion of the linking rod is threadedly received by a second said portion of the linking rod.

* * * * *